US005577427A

United States Patent [19]

Haar

[11] Patent Number: 5,577,427

[45] Date of Patent: Nov. 26, 1996

[54] PLATE POSITIONING AND FEEDING SYSTEM FOR A PUNCH

[75] Inventor: Thomas Haar, Halstenbek, Germany

[73] Assignee: Alfons Haar Maschinenbau GmbH & Co., Hamburg, Germany

[21] Appl. No.: 215,520

[22] Filed: Mar. 22, 1994

[30] Foreign Application Priority Data

Mar. 26, 1993 [DE] Germany .......................... 43 09 949.1

[51] Int. Cl.$^{6}$ .............................. B65G 25/04; B26F 1/02

[52] U.S. Cl. ................................ 83/206; 83/211; 83/277; 83/280; 83/364; 83/367

[58] Field of Search ............................. 83/206, 209, 211, 83/213, 214, 255, 251, 268, 277, 280, 364, 367, 72, 76.8; 198/341, 468.2

[56] References Cited

U.S. PATENT DOCUMENTS

| | | | |
|---|---|---|---|
| 3,600,997 | 8/1971 | Schmidt | 83/364 |
| 4,382,395 | 5/1983 | Haar | 83/71 |
| 4,468,992 | 9/1984 | McGeehee | 83/364 X |
| 4,778,044 | 10/1988 | Kondo | 83/280 X |
| 4,817,477 | 4/1989 | Emery et al. | 83/364 X |
| 5,016,506 | 5/1991 | Bulso, Jr. et al. | 83/251 X |
| 5,083,487 | 1/1992 | Croteau | 83/364 X |
| 5,400,652 | 3/1995 | Haar | 83/277 X |

FOREIGN PATENT DOCUMENTS

| | | |
|---|---|---|
| 539669 | 8/1992 | European Pat. Off. . |
| 3437642 | 4/1986 | Germany . |
| 3841683 | 11/1989 | Germany . |

*Primary Examiner*—Rinaldi I. Rada
*Attorney, Agent, or Firm*—Vidas, Arrett & Steinkraus, PA

[57] ABSTRACT

A pair of numerically controlled feed devices are successively operated, with the second feed device taking over from the first feed device when two or more punching steps have been performed. A trailing row of punching tools performs the first punching step with respect to a fresh plate at the same time when a leading row of tools performs the last punching step with respect to the preceding plate. There are provided sensors to determine plate length and/or angularity of the plate edges in order to enable a numerical control to compute correction data for correcting the feeding of the plate whereby punching through the trailing and leading edges of the plates is avoided.

12 Claims, 5 Drawing Sheets

PLATE POSITIONING AND FEEDING SYSTEM FOR A PUNCH

BACKGROUND AND SUMMARY OF THE INVENTION

The present invention relates to a plate positioning and feeding system for a punch comprising: a punch including a plurality of punching tools; a positioning station disposed upstream of the punch and including positioning means for positioning a plate with respect to a pair of orthogonal axes; a first feed device including first gripping means adapted to be displaced at least along the feed direction by first drive means between leading and trailing positions and arranged to grip a plate in the positioning station when it is in its trailing position and to advance the plate to the punch; a second feed device including second gripping means adapted to be displaced at least along the feed direction by second drive means between leading and trailing positions and arranged to grip a plate when it is in its trailing position and to advance the plate to the punch.

Such systems are used to feed plates, for example of steel or aluminum sheet material, to a punch which punches out a predetermined number of blanks from each plate. By means of said feed devices each plate is moved step by step through the punch and is subjected to punching steps while it is stationary.

Various feeding systems have become known and are shown for example in U.S. Pat. No. 4,382,395, German Patent 34 37 642, European Patent Specification 92 113 561.2 and German Patent 38 41 683.

The punching of the plates should be performed such that as little material as possible will remain in the punched plates in order to save material. On the other hand it is to be avoided that the punching tools punch through the edges of the plates. Accordingly, it is imperative that the plates be advanced as precisely as possible. The prior art feed systems do not allow for precise positioning and/or require sophisticated and costly control systems for precise positioning of the plates.

It is an object of the present invention to provide a plate positioning and feeding system for a punch, which allows for precise positioning of the plates while they are punched.

A further object of the present invention is to provide a plate position and feeding system for a punch, which ensures precise feeding of the plates.

A further object of the present invention is to provide a plate positioning and feeding system for a punch, which allows to punch the plates so that residual meshes of minimum material result and punching through the trailing and leading edges of the plates is avoided.

A further object of the present invention is to provide a plate positioning and feeding system for a punch, wherein idle strokes of the punch are avoided.

A plate positioning and feeding system for a punch as defined above includes, according to the present invention, the following features: the punch includes a pair of rows of punching tools, with the rows being spaced along the feed direction of the plates; said first feed device is arranged to advance the plates to a transfer position which is downstream of said positioning station; said second feed device is arranged to grip each plate when it has reached said transfer position, said transfer position is arranged to correspond to the positioning of the plates during a punching stroke of the punch after the punch has performed at least one preceding punching stroke on a plate; said first and second feed devices cooperate so that the leading row of punching tools performs the last punching stroke with respect to a first plate at the same time when the trailing row of punching tools performs the first punching stroke with respect to the following plate.

In the system of the present invention there are two rows of punching tools spaced from each other along the feed direction. The tools in one row may be aligned to the tools of the other row or may be laterally offset thereto. The present invention uses a pair of feed devices of which the first one feeds a plate from a positioning station wherein the plate is precisely positioned, i.e. precisely aligned with respect to reference coordinates. It is important that the second feed device takes over the plate only after the punch has performed two or more punching strokes. In this manner idle strokes of the punch are avoided. However, this requires that the plates are advanced to the punch without any gaps being present between the plates, such that the last punching step with respect to a plate coincides with the first punching step with respect to the following plate.

With a tool arrangement wherein the leading row of tools includes one tool less that the second row of tools, the—precisely positioned—plate may be guided during the whole punching operation by prongs or other gripping means on the side of the plate which has not yet been punched.

When both rows include the same number of tools, the last advancing step of the plate must be performed by a suitable feeding means, for example a roller feed. Since this is only the last step, all necessary corrections can be performed before. This allows to define the last plate position by mechanical means in the punch instead of for example by an unprecise roller feed.

The prongs or gripping means may be mounted to stiff supports and may be moved by spindles so that high speed cycling is possible. A gripping edge is not required because the feed prongs which hold the plate at the end of the machine operation are disposed laterally of the plates.

Immediately after the change-over the first feed device can be returned to the original position so as to grip a following plate in the positioning station. During the return stroke the gripping means are lowered in order to avoid any interference with the following plates entering the positioning station. The length of the path along which the gripping means of the first feed device have to be moved during the return stroke needs hardly be more than the length of a plate. This may be obtained in a sufficiently short time by means of conventional drive means.

Since the gripping means of the second feed device grip the plate only after the first feed device has advanced the plate already for some punching steps in the punch, the return stroke of the gripping means of the second feed device is relatively short. Also in this case a punching operation without any idle strokes of the punch is possible.

Furthermore, it is important that the drive means of the first and second feed devices are controlled by a numerical control. The numerical control enables advance movements which are precise both with respect to time and space so that idle strokes of the punch are avoided even under extremely unfavourable conditions.

It is known that the plates are cut from band stock material by plate scissors. As a result plate length and angularity of the cut edges may vary within the manufacturing tolerances. In this connection the present invention proposes to provide a pair of sensors which are spaced from each other for a predetermined amount transversely to the feed direction and which are arranged to detect the leading and trailing edges of a plate in order to provide corresponding signals.

The sensors allow to determine any deviation of the leading and, respectively, trailing edges from the transverse axis. The deviation as determined is used to compute a correction value for the numerical control. If such deviation is of a value so that punching through one of the edges of the plate cannot be avoided, it is possible to provide a stop signal. As an alternative one punching stroke may be skipped in order to avoid the production of faulty blanks.

When the plate advances from the positioning station to the position for the first punching operation, the leading edge of the plate passes both sensors. The switch-on signals, i.e. the occurrences of the signals by the sensors will be related to the actual position of the feed device. This position may be determined by the measuring system of the numerical control at a resolution of 0.01 mm. This allows to correct the further feed of the plate according to the measuring result.

If the switch-on signals of both sensors for one edge of a plate will be related to each other, any incorrectness of the angularity of the respective plate edge may be determined.

When the punch includes a pair of rows of tools, only the leading row of tools is used during the first punching step with respect to a certain plate. It must be ensured that the tools do not punch through the leading edge of this plate at this punching step; furthermore, the plate must not extend into the punching area of the second row of tools at this time. From this follows that any deviation of the angularity must be below a predetermined value in order to avoid edge punching. If this cannot be avoided the operation of the punch is interrupted, or the first critical punching step is skipped.

Additionally, the leading edge of the plate altogether may be related to the length of the path which the plate has to be moved to reach the tool. This allows to correct the first punching position, independently of the actual length of the plate, so that edge punching is avoided. Correction of the first punching position of the plate in accordance with the distance for which the plate is still to be moved and as determined by the sensors allows maximally to increase the upper limit for deviations of the angularity. It is desired that only few plates exceed the upper limit even with a small remaining web width of for example 0.98 mm. This ensures to optimally use the space present between the rows of tools. If the plates would be moved into a fixed first punching position which cannot be corrected, it would be necessary to provide a greater value of the remaining web width.

The sensors may be spaced transversely to the feed direction for a predetermined amount and may be arranged to sense the leading and trailing edges of a plate in order to provide corresponding signals. The spacing of the sensors is preferably only slightly less than the width of the plates in order to provide for high measuring accuracy. The numerical control stores a desired value of the length of the plates. The numerical control computes an actual value of the plate length from the two sensor signals. The precise actual length of the plate may be determined by sensing the leading and, respectively, trailing edge of the plate and by use of the values stored in the numerical control. This, however, requires extremely sensitive sensors. This is why the present invention suggests to use laser light sensors as the sensors. The actual length of a plate as determined above is compared to the desired value, and the difference between the desired and actual values is used to determine a correction value for correction of the following feeding steps.

The position of the feed device at which the leading edge of the plate is sensed can be related to a fixed predetermined value which is to be expected as the result of the preceding positioning of the plate when the plate is of normal length. Any deviation of this value indicates a deviation of the desired plate length. Within the geometrical possibilities of the tool arrangement the remaining web width of the plate may be used for correcting the total plate length. Determining the plate length in the above described manner requires that the plate in the positioning station has its trailing and lateral edges precisely positioned with respect to reference coordinates.

During the following machining of the plate the same sensors sense the trailing plate edge in the same manner. The evaluation of any deviation of angularity is the same as with the leading edge, however by using switch-off signals. The angularity is monitored, and the actual spacing of the trailing edge of the plate from the tools is sensed and used for correcting the following punching positions and, respectively, feeding steps.

If the plate length is measured before the first punching step, the control of the first feed device must be corrected when a changed plate length has been detected by the sensors and a correction value has been determined. If a second feed device is used which takes over the plate from a first feed device when the plate is already in the punch, the feed length is changed similarly when an actual plate length deviating from a desired value has been detected in order to avoid punchings through the trailing edge of a plate.

Furthermore, a stop signal may be generated also when the comparison of the plate length desired and actual values shows a deviation which would result in faulty blanks.

The gripping means of the second feed device may be moved for a particularly short path when they are arranged to grip the plate in the transfer position at the trailing end of the plate from opposite sides thereof.

Before the gripping means of the first feed device engage a plate, the plate must be positioned precisely with respect to reference coordinates. This is obtained in the positioning station. Of course, the plate must be moved into the positioning station by suitable conveyor means. To this end, a third feed device is provided, which feeds the plate from a loading station to the positioning station. According to an embodiment of the invention the third feed device includes a pair of parallel conveyor means, for example conveyor bands, which are driven by separate numerically controlled third drive means and which each include a drive member. The drive members are disposed so that one of said drive members is upstream of a plate and the other one is downstream of the plate. The leading drive member which has moved a plate to the positioning station is initially moved into engagement with the leading edge of the following plate, which may require that it is moved back. The leading drive member along with the trailing drive member which engages the trailing edge of the following plate move the plate into the positioning station. Only when this operation has been terminated, the leading drive member returns along with the returning run of the conveyer band, and the leading drive member now becomes the trailing drive member for feeding a further plate towards the positioning station. The separately driven conveyor means allow for rapid and precise feeding of the plate to the positioning station, with the leading drive members acting as abutments during the breaking phase.

As an alternative the third feed device may comprise numerically controlled feed rollers engaging the plate from above and from below. The pairs of rollers are preferably driven by a single servomotor. A first pair of rollers is positioned downstream of the location of plate separation preferably for less than a plate length and is arranged to decelerate and transfer the plate to a second numerically controlled pair of rollers which conveys the plate into the positioning station. Such pair of rollers stops the plate and then is moved apart preferably for a few millimeters in order not to interfere with the positioning operations.

BRIEF DESCRIPTION OF PREFERRED EMBODIMENTS

The present invention will now be explained in more detail with reference to the drawings in which.

DETAILED DESCRIPTION OF PREFERRED EMBODIMENTS

Figure 1:
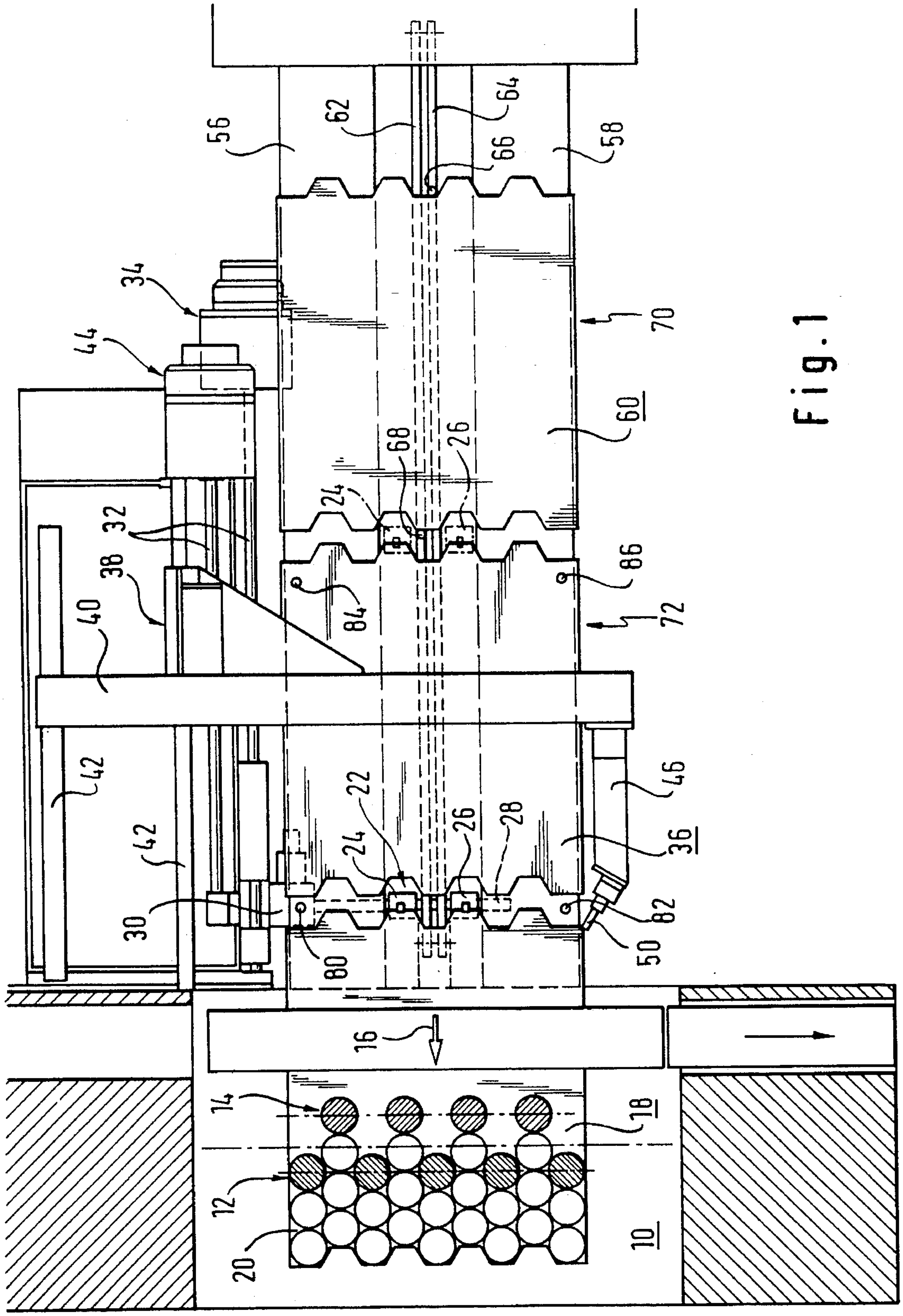
FIG. 1 is a schematic elevation, partially in section, of a plate positioning and feeding system in accordance with the present invention.
Figure 2:
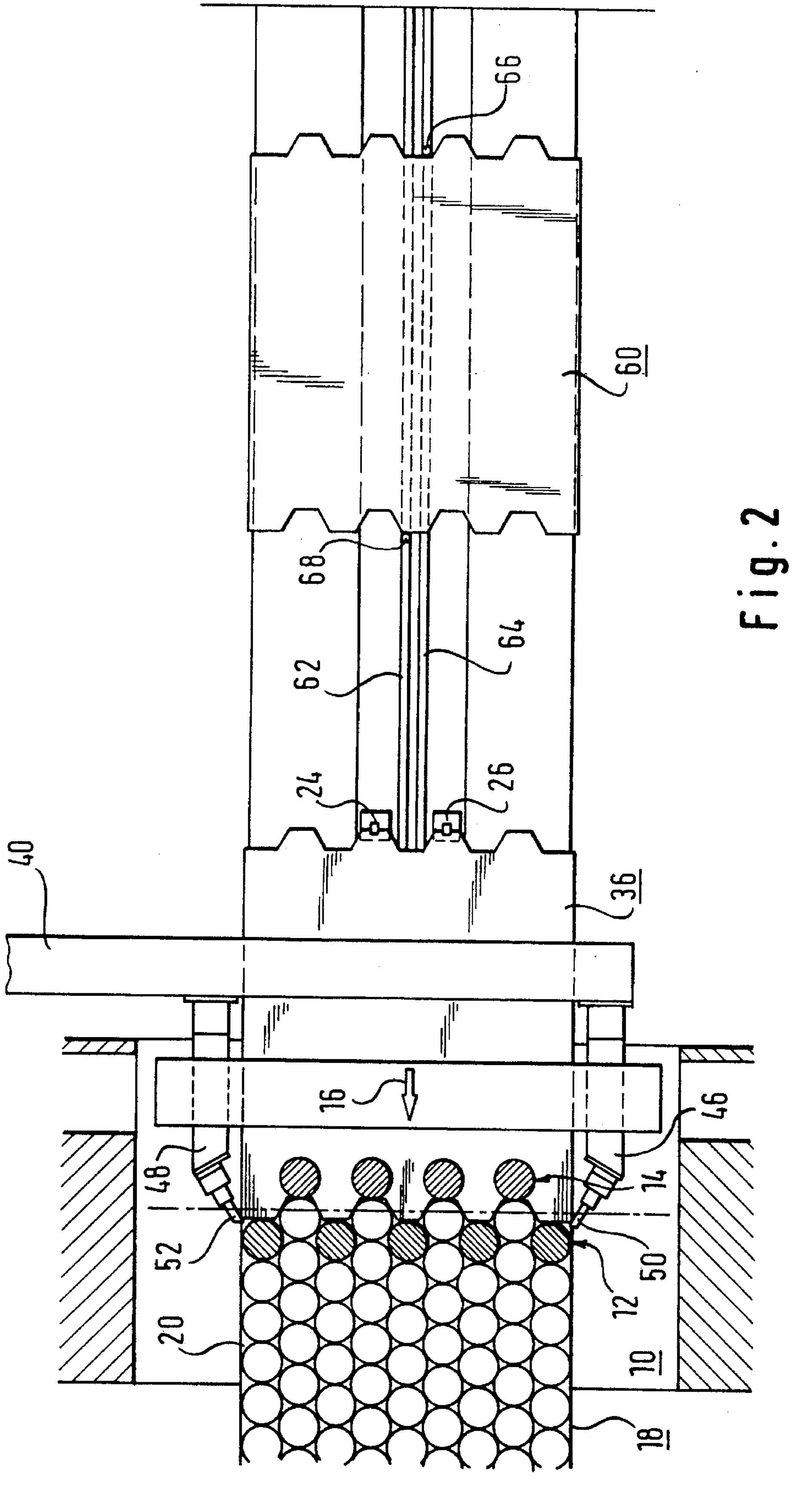
FIG. 2 is an elevation similar to FIG. 1, with the system being in a different operative condition.

Referring to FIGS. 1 and 2, a punch 10 is schematically shown; the punch 10 includes punching tools disposed in a pair of rows 12 and 14. The row 12 which is the leading row with respect to the feed direction 16 includes five tools, while the trailing row 14 includes four tools which are laterally offset with respect to the tools of the leading row 12. As is known in the art the tools are simultaneously actuated by a single punching stroke so as to punch out circular blanks from leading plate 18 of which a so-called mesh 20 will remain.

A first feed device 22 includes a pair of gripping means or prongs 24, 26 arranged to grip the trailing edge of scrolled plate 18. The prongs 24, 26 are mounted to an arm 28 of a carriage 30 which is displaceable in the feed direction 16 along guides 32 by means of a first drive 34. The gripping prongs 24, 26 are adjustable in height in order not to interfere with a following plate such as plate 36 when it returns to its original position.

Figure 3:
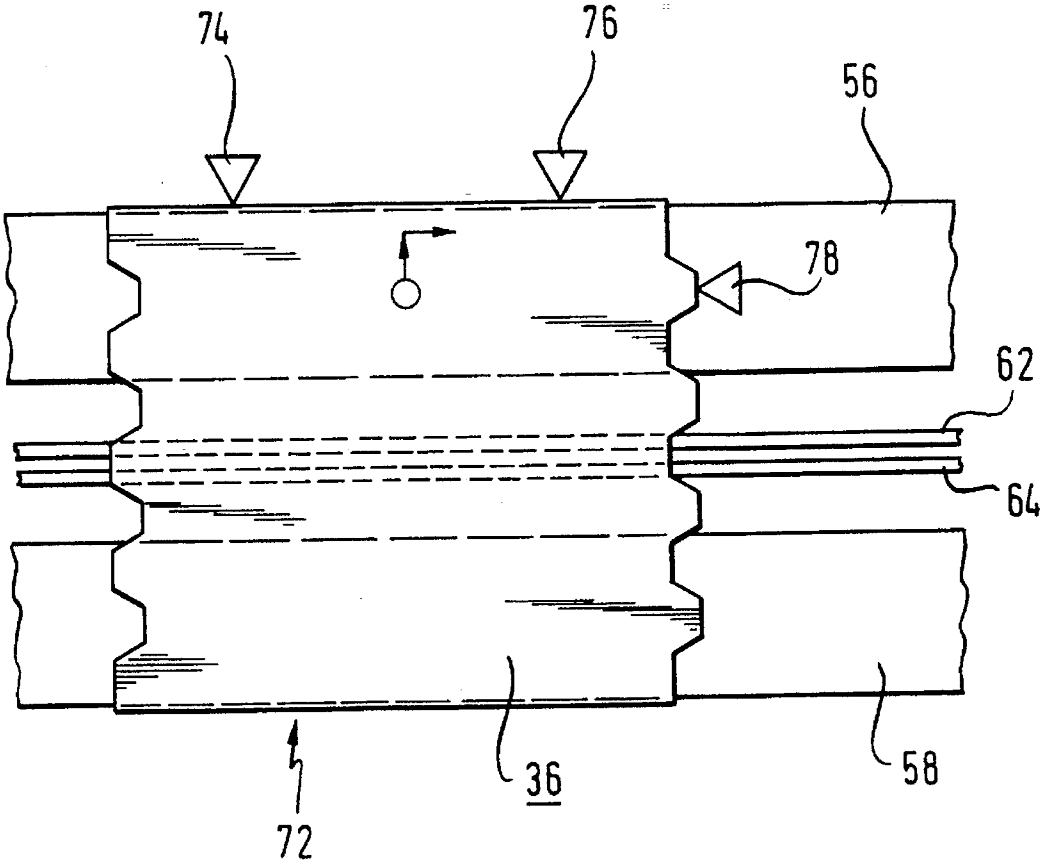
FIG. 3 is an elevation of a detail of the system shown in FIG. 1.

A second feed device 38 includes a carriage 40 which is also displaceable in the feed direction 16 along guides 42. To this end a drive 44 is provided. The carriage 40 supports a pair of arms 46, 48 of which only arm 46 is shown in FIG. 1 for clarity reasons (FIG. 2 does not show the first feed device except for the gripping means 24, 26). To arms 46, 48 are mounted second gripping means or prongs 50, 52 which grip the plates from laterial sides at their trailing ends. A loading device (not shown) positions the plates upon a pair of parallel slide surfaces 56, 58 which extend to the punch 10. In FIGS. 1 and 2 a plate 60 is shown to be in a loading station 70. Between the slide surfaces 56, 58 extends a pair of parallel narrow conveyor bands 62, 64 which are driven independently of each other by a third drive (not shown). Each convenyor band 62, 64 includes a drive member or drive dog 66, 68. As shown one drive member 66 engages the trailing edge of a plate 60, while the other drive member 68 is disposed at or ahead of the leading edge of plate 60. By means of the drive members 66, 68 the plate 60 is moved from the loading station 70 to a positioning station 72 which receives the plate 36. The positioning station 72 has been shown in FIG. 3 in more detail in order to indicate that positioning or aligning means (not shown) are provided to position the plate 36 against a pair of lateral abutments 74, 76 and a rear abutment 78. Such positioning or aligning means are well known in the art.

In FIG. 1 laser light sensors 80, 82 are shown to be in the leading area of the positioning station 72, and laser light sensors 84, 86 are shown to be in the trailing area of the positioning station 72. The pairs of light sensors 80, 82 and 84, 86 are spaced from each other for a predetermined amount. The sensors of a pair 80, 82 and, respectively, 84, 86 are disposed along a transverse axis extending perpendicularly to the feed direction 16. It is to be understood that only a single pair of light sensors such as 80, 82 would be able to perform all required functions.

Finally it is to be noted that the drives 34, 44 and the drive of the conveyor bands 62, 64 are controlled by a numerical control (not shown).

The operation of the system as described is as follows:

The loading device (not shown) positions a plate 60 upon the surfaces 56, 58 in the loading station 70, and the drive member 66 of the conveyor band 64 advances the plate 60 to the positioning station 72, possibly along with the feeding of the plate 36 from the positioning station 72 towards the punch 10. In the positioning station 72 the plate 36 is positioned or aligned along a pair of orthogonal axes by positioning or aligning means (not shown). The gripping means 24, 26 of the first feed device 22, which are lowered when the carriage 30 returns in order not to interfere with the feeding of a plate to the positioning station, grip the plate 36 at its trailing end as indicated by dash-dotted lines in FIG. 1. At this time the second feed device 38 advances the plate 18 through the punch 10 by means of the gripping means 50, 52. Feeding of plates 36, 18 and operation of feed devices 22 and 38 are coordinated by the numeric control such that the last punching step with respect to plate 18 occurs at the same time as the first punching step with respect to plate 36, as indicated in FIG. 2. The last punching of plate 18 is performed by the tools of row 12, and the first punching of the fresh plate 36 is performed by the tools of row 14. The change-over, accordingly, occurs without any idle stroke of punch 10.

As soon as the last punching of the plate 18 has been performed, the gripping means 50, 52 are released, and the carriage 40 can be returned to its initial position as shown in FIG. 1. The gripping means 24, 26 of the first feed device 22 take over the feeding of plate 36 through punch 10 for a number of punching steps, for example two or more. This is why the gripping means 50, 52 need to be moved for a relatively short back stroke before the change-over as may be seen from a comparison of FIGS. 1 and 2. The advancing of plate 18 during the first part of the punching steps is performed by the gripping means 24, 26 shown in full lines. When a predetermined number of punching steps has been reached, the change-over from the first feed device 22 to the second feed device 38 is accomplished by opening the gripping means 24, 26 and closing the gripping means 50, 52. This change-over occurs during a punching stroke, i.e. during engagement of the tools with the plate, because the plate is held in a fixed position at this time. Thereafter the second feed device 38 carries out the remaining feeding or advancing steps until the "empty" residual mesh is removed by (not shown) ejection means such as a pair of driven rollers.

When the gripping means 24, 26 have been opened, they are lowered below the plane of advancing movements and returned to the initial position (indicated in FIG. 1 by dash-dotted lines) in order to engage a following plate 36 and to advance it to the punch 10.

Feeding of a plate 60 from the loading station to the positioning station, which is performed by means of the respective trailing drive member 66 or 68, is accomplished relatively precisely and smoothly in that the respective leading drive member 68 or 66 acts as an abutment or braking means so that transfer of the plate to the positioning station 72 occurs very smoothly.

When a plate 36 is moved by the first feed device 22 from the positioning station 72 towards the punch 10, the leading edge of plate 36 passes both laser light sensors 80, 82. As a result sensors 80, 82 provide signals. The actual length of the plate 36 and any deviation thereof from a desired length may be determined from such signals or their occurances when they are compared or related to the location at which the trailing edge of the plate 36 should be due to the numerically controlled feed. The feed may now be corrected by means of a correction value. As an alternative the length of the plate may be determined by sensing the trailing edge of the plate 36 by sensors 84, 86. The numerical control allows precisely to determine the path of travel between passing the leading sensors 80, 82 and passing the trailing sensors 84, 86. Because the spacing between the sensors 80, 82 on the one hand and 84, 86 on the other hand is known, the actual length of plate 36 and any deviation thereof from a desired length may be determined in this manner.

The actual length of the plate 36 as determined by the numerical control is compared to a stored value of the desired length. If for example the plate 36 is shorter than the desired length, the numerical control must ensure that the first feed device 22 advances the plate 36 sufficiently far into the punch 10 so that at the first punching step a web remains at the leading edge of the plate 36 as shown in FIG. 2 since otherwise faulty blanks would be produced. This is why the numerical control uses any deviation between desired and actual plate length to compute a correction value in order to correct the feed path or the length of the feed steps so that no faulty blanks are produced. The same is true for the feeding of the leading plate 18 by the second feed device 38. If the plate is too short, faulty punching at the rear end of the plate 18 could result. Correspondingly correcting the feed of the feed device 38 between the stamping steps ensures that a web remains also at the trailing edge of the plate. This may be achieved for example by making each of the feeding steps performed by the feed device 38 somewhat shorter than originally programmed, with the result that the webs between the punchings also become somewhat narrower. Altogether, however, this allows to "gain" a certain length which ensures that punching through the trailing edge will not occur at the last punching step. If only the leading sensors 80, 82 are used, sensing of the trailing plate edge allows also to determine the plate length or the residual plate length available for the remaining punching steps in order to be able to provide for a correction of the feed in the above described manner.

Providing two sensors 80, 82 or 84, 86 along a single transverse axis allows furthermore to determine the angularity of the leading and trailing edges of the plates. If the respective edge does not extend perpendicularly to the feed direction 16, corresponding correction measures are performed in the above described manner. If the angularity and/or the length of a plate deviate too much from desired values, it would be possible to provide a stop signal for interrupting operation of the punch. As an alternative one punching step may be eliminated in order to provide for respective compensation.

As may be appreciated it is possible to use only a pair of sensors which are for example close to the tools; this of course would be simpler than the use of four sensors.

Figure 4:
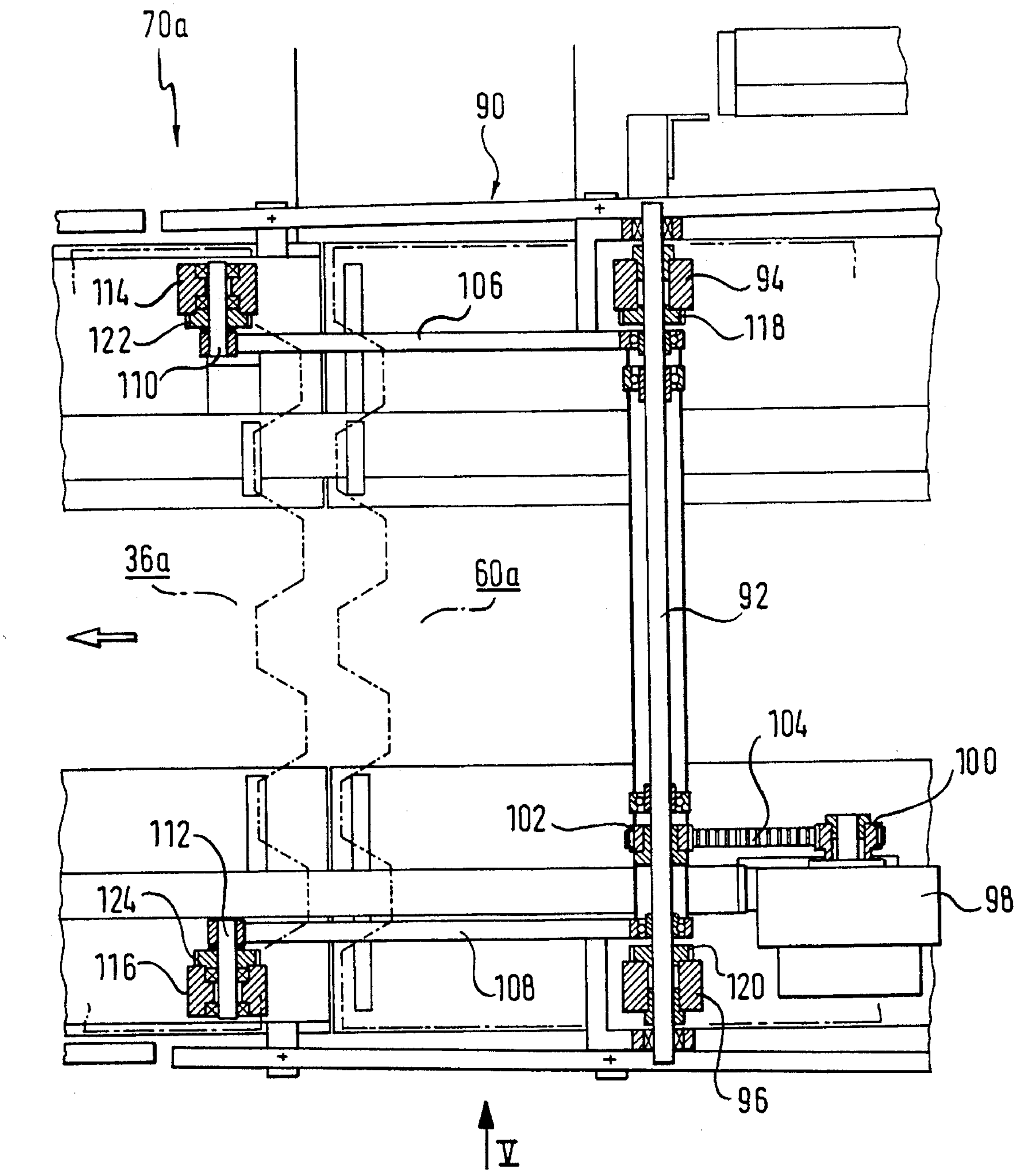
FIG. 4 is an elevation of a modified embodiment of a loading station of the system in accordance of the present invention.
Figure 5:
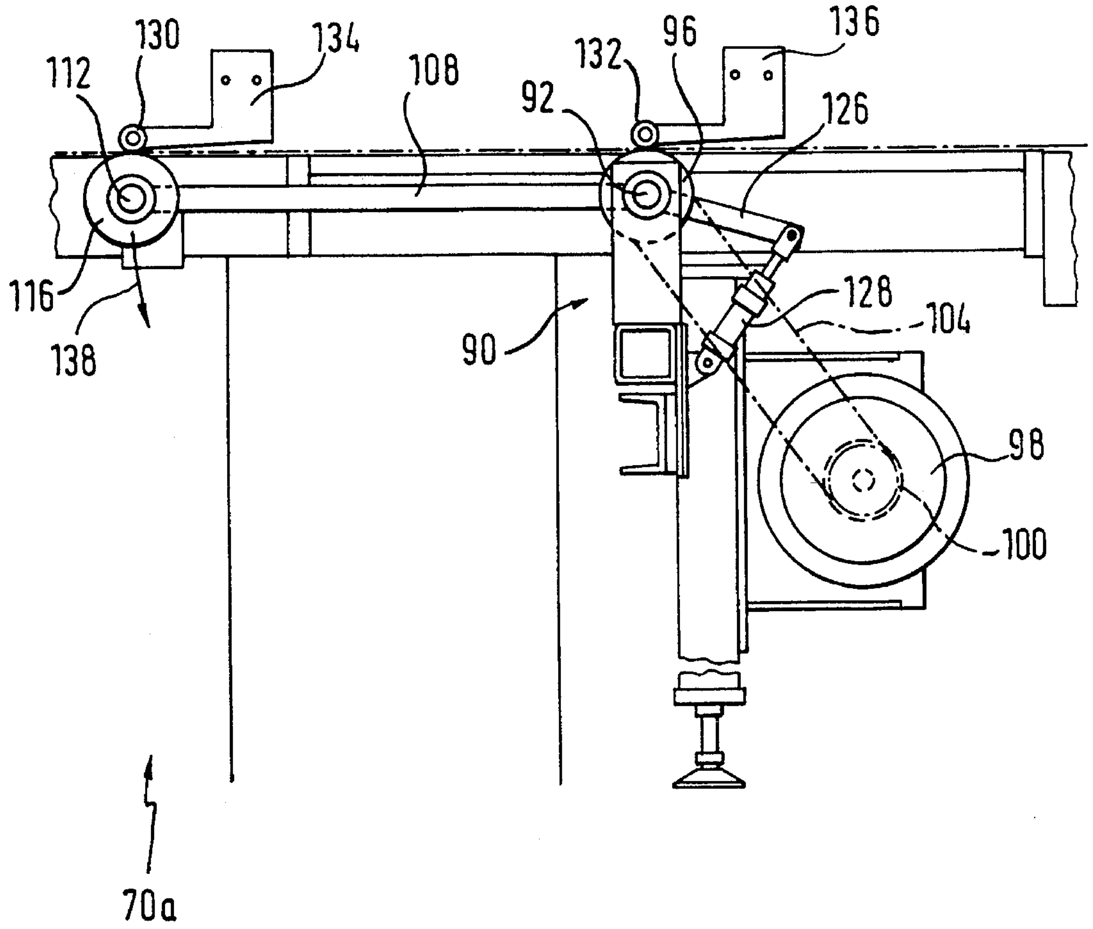
FIG. 5 is a side elevation of the loading station in FIG. 4 as seen in the direction of arrow 5.

In the modified system of FIGS. 4 and 5 the loading station 70*a* includes a frame 90 in which a shaft extending transverse to the feed direction is rotatably mounted. To the shaft 92 a pair of spaced feed rollers 94, 96 is non-rotatably mounted, and the shaft 92 is driven by a servomotor 98 which includes a gear 100 which is drivingly connected to a gear 102 of shaft 92 via a tooth belt 104. Lever arms 106, 108 are rotatably mounted with their one ends to the shaft 92. With their other ends they retain bearing pins 110, 112 for rotatably mounting feed rollers 114, 116. Gears 118, 120 are connected to feed rollers 94, 96, and gears 122, 124 are connected to feed rollers 114, 116. The gears are connected to each other by suitable drive means so that the feed rollers 114, 116 are rotated when the feed rollers 94, 96 are rotated. As may be seen in particular in FIG. 5, the arms 106, 108 are connected to one end of a lever arm 126 which has its other end pivotally mounted to an actuating cylinder 128.

The rollers 94, 96 and, respectively, 114, 116 cooperate with upper rollers of which are shown two rollers 130, 132 in FIG. 5. They are rotatably mounted to respective fixed supports 134, 136. Actuation of the actuating cylinders 128 allows to pivot rollers 114, 116 downwardly for a small amount as indicated by the arrow 138.

The leading pair of rollers is disposed downstream of the location of plate separation for an amount which is smaller than the length of a plate 60*a*, as indicated at the right side of FIG. 1. The numeric drive of feed rollers 94, 96, 114, 116 via the servomotor 98 allows to decelerate the plate 60*a* and to transfer it to the synchronously driven second pair of rollers 114, 116 which moves the plate 60 to the positioning station (72 in FIG. 1). In the positioning station the plate which has been designated by 36*a* in FIG. 4 is brought to a stop. Thereafter the actuating cylinder 128 is actuated in order to move the rollers 114, 116 a small amount away from the upper rollers 130 in order not to interfere with the positioning of plate 36*a*.

I claim:

1. A plate positioning and feeding system for a punch, comprising:

a) a punch (10) including a plurality of punching tools (12, 14);

b) a positioning station disposed upstream along a feed direction (16) of the punch (10) and including positioning means for positioning a plate (36) with respect to a pair of orthogonal axes (74, 76; 78);

c) a first feed device (22) including first gripping means (24, 26), wherein the first gripping means is displacable in a linear direction along the feed direction (16) towards the punch by a first drive means (34) between leading and trailing positions so that when in the trailing position the first gripping means grip a plate (36) in the positioning station (72) and advances the plate to the punch (10);

d) a second feed device (38) including second gripping means (50, 52), wherein the second gripping means is displacable along the feed direction (16) by a second drive means between leading and trailing positions so that when in the trailing position the second gripping means grip a plate and advances the plate to the punch (10); the improvement of which includes the following features:

e) the punch (10) includes a pair of rows of punching tools (12, 14), with the rows being spaced along the feed direction of the plates (18, 36, 60);

f) said first feed device (22) being linearly displacable in the positioning station to advance the plates from the positioning station to a transfer position which is downstream of said positioning station (72) and upstream of said punching tools;

g) said second feed device (38) being displacable along the feed direction in the transfer position to grip each plate when it has reached said transfer position;

h) said transfer position is located to correspond to the positioning of the plates (18, 36) during a punching stroke of the punch (10) after the punch (10) has performed at least one preceding punching stroke on a plate;

i) said first and second feed devices (22, 38) being movably located to cooperate so that the second feed device positions the first plate and that the first feed device positions the second plate so that the leading row of punching tools (12) performs the last punching stroke with respect to a first plate (18) at the same time when the trailing row of punching tools (14) performs the first punching stroke with respect to the following plate (36).

2. A system as defined in claim 1 wherein said second gripping means (50, 52) are positioned to laterally grip each plate (18) from opposite sides at the trailing end thereof when the plate (18) is in said transfer position.

3. A system as defined in claim 1 wherein a loading station (70) is provided upstream of said positioning station (72) and a third feed device is provided to advance the plates (60) into said positioning station (72).

4. A system as defined in claim 3 wherein said third feed device includes a pair of parallel conveyor means (62, 64) driven by separate numerically controlled third drive means and each including a drive member (66, 68), with the drive members (66, 68) being arranged along the respective conveyor means so that one of said drive members is disposed upstream of a plate (60) and the other is disposed downstream of said plate (60).

5. A system as defined in claim 4 wherein the conveyor means (62) of the leading one (68) of said drive members (66, 68) is controlled so that it engages the leading edge of a plate (60) when said plate (60) is advanced towards said positioning station (72).

6. A system as defined in claim 3, said third feed device further including feed rollers (94, 96, 114, 116, 130, 132) spaced along the feed direction, wherein the feeding rollers engage a plate (**60*a*, 36*a*) from the upper and lower sides of the plate and move the plate in the feed direction (16) and are driven in unison by a numerically controlled drive (98), the spacing of the feed rollers in the feed direction being smaller than the length of a plate (60*a*, 36*a*) and the leading feed rollers (114, 116) being displaceable out of the feed path of the plate (60*a*, 36*a*) and being coupled to an actuating device (128**).

7. A system as defined in claim 6, wherein lower rollers of said leading feed rollers (114, 116) are supported by arms (106, 108) which are pivotally mounted to a frame (90) and are engaged by at least one actuating cylinder (128).

8. A system as defined in claim 1, further comprising at least one pair of sensors (80, 82, 84, 86) being spaced from each other transverse to the feed direction for a predetermined amount, the sensors being located along the feed direction to sense the leading and trailing edges of a plate (36) so as to provide corresponding signals, and a numerical control for said first and second drive means (34, 44) to determine an actual value of the plate length from said sensor signals and the feed data of the respective feed device as stored in said numerical control and to compare said actual value with a desired value stored in said numerical control and to compute a correction value from the difference between said desired and actual values, said correction value being used to correct the remaining feed of the respective plate by said first drive means (34) and the feed of said plate by said second drive means (44).

9. A system as defined in claim 8 wherein at least a pair of sensors (80, 82; 84, 86) is provided in spaced relationship to each other along a transverse axis which extends perpendicularly with respect to the feed direction, which sensors are located along the feed direction to sense the leading and trailing edges of a plate (36) in order to provide signals to be used in said numerical control for determining any deviation of the edges of the respective plate (36) from said transverse axis (angularity).

10. A system as defined in claim 9 wherein said numerical control provides a stop signal when the difference between said desired and actual values or the deviation of the plate edges from said transverse axis exceeds a predetermined value.

11. A system as defined in claim 8 wherein said sensors (80, 82, 84, 86) comprise laser light sensors.

12. A plate positioning and feeding system for a punch, comprising:

a) a punch (10) including a plurality of punching tools (12, 14);

b) a positioning station disposed upstream along a feed direction (16) of the punch (10) and including positioning means for positioning a plate (36) with respect to a pair of orthogonal axes (74, 76; 78);

c) a first feed device (22) including first gripping means (24, 26), wherein the first gripping means is displacable in a linear direction along the feed direction (16) towards the punch by a first drive means (34) between leading and trailing positions so that when in the trailing position the first gripping means grip a plate (36) in the positioning station (72) and advances the plate to the punch (10);

d) a second feed device (38) including second gripping means (50, 52), wherein the second gripping means is displacable along the feed direction (16) by a second drive means between leading and trailing positions so that when in the trailing position the second gripping means grip a plate and advances the plate to the punch (10); the improvement of which includes the following features:

e) the punch (10) includes a pair of rows of punching tools (12, 14), with the rows being spaced along the feed direction of the plates (18, 36, 60);

f) said first feed device (22) being linearly displacable in the positioning station to advance the plates to from the positioning station to a transfer position which is downstream of said positioning station (72) and upstream of said punching tools;

g) said second feed device (38) being displacable along the feed direction in the transfer position to grip each plate when it has reached said transfer position;

h) said transfer position is located to correspond to the positioning of the plates (18, 36) during a punching stroke of the punch (10) after the punch (10) has performed at least one preceding punching stroke on a plate; and i) means for controlling said first and second feed devices (22, 38) so that the second feed device positions the first plate and that the first feed device positions the second plate so that the leading row of punching tools (12) performs the last punching stroke with respect to a first plate (18) at the same time when the trailing row of punching tools (14) performs the first punching stroke with respect to the following plate (36).

* * * * *